United States Patent
Keyes

(10) Patent No.: US 7,037,557 B2
(45) Date of Patent: May 2, 2006

(54) CERAMIC COATING PROCESS FOR PRE-INSULATED PIPING

(75) Inventor: Thomas Joseph Keyes, Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 245 days.

(21) Appl. No.: 10/440,872

(22) Filed: May 19, 2003

(65) Prior Publication Data

US 2004/0231743 A1 Nov. 25, 2004

(51) Int. Cl.
B05D 5/00 (2006.01)

(52) U.S. Cl. ............ 427/243; 427/244; 427/247; 138/146; 138/149

(58) Field of Classification Search ............ 138/149, 138/146, 143, 171; 427/243, 244, 247, 402, 427/421–427, 154, 156
See application file for complete search history.

(56) References Cited

U.S. PATENT DOCUMENTS

| | | | |
|---|---|---|---|
| 2,857,931 A * | 10/1958 | Lawton ................. 285/55 |
| 3,450,661 A * | 6/1969 | Neel et al. ............. 524/556 |
| 3,453,716 A * | 7/1969 | Cook .................... 29/421.1 |
| 3,709,772 A * | 1/1973 | Rice ..................... 138/146 |
| 3,845,066 A * | 10/1974 | Vasta .................... 524/247 |
| 4,044,184 A * | 8/1977 | Ashida et al. ........... 428/113 |
| 4,874,648 A * | 10/1989 | Hill et al. .............. 428/35.9 |
| 4,878,520 A * | 11/1989 | Nakamura et al. ...... 138/149 |
| 6,273,144 B1* | 8/2001 | Bohon et al. .......... 138/149 |
| 6,349,542 B1* | 2/2002 | Moore, III ............ 60/323 |
| 6,382,259 B1* | 5/2002 | Codling ............... 138/149 |
| 2002/0066491 A1* | 6/2002 | Lively ................ 138/149 |

* cited by examiner

Primary Examiner—James Hook
(74) Attorney, Agent, or Firm—Charles D. Gunter, Jr.

(57) ABSTRACT

A high temperature pre-insulated pipe system is shown which can withstand conveyance temperatures in excess of 250° F. The pipe system includes a first and second length of insulated and jacketed pipe. Each pipe length includes an inner metal pipe having an interior surface and an exterior surface and having an envelope of foamed insulation surrounding the inner pipe exterior surface. A thermally protective coating layer is applied between the metal pipe exterior and the surrounding layer of foamed insulation. The thermally protective layer effectively lowers the interface temperature between the inner metal pipe and outer foamed layer to prevent disbondment of the outer foamed layer as the temperature of the inner pipe increases.

5 Claims, 2 Drawing Sheets

CERAMIC COATING PROCESS FOR PRE-INSULATED PIPING

BACKGROUND OF THE INVENTION

1. Field of the Invention

The present invention relates to foam bonded pre-insulated piping systems, and more specifically to a structure and method for preventing the disbondment of the foam from the carrier pipe as these systems thermally expand in the presence of high temperature fluids being conveyed.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Insulated pipe is conventional and commercially available. There are predominately two types of piping systems in use: Class-A drainable dryable testable (DDT); and polyurethane or polyisocyanurate bonded foam systems. The present application is directed toward the bonded foam type system. These systems utilize a steel pipe to convey fluid. Around the outside of the steel pipe is a layer of insulating foam such as, for example, polyisocyanurate foam. Around the outside of the foam is a jacket of hard thermoplastic (such as high density polyethylene, HDPE). The plastic jacket protects the foam from mechanical damage and also provides a water tight seal to prevent corrosion of the steel pipe. Although steel is commonly used for the inner pipe which carries the media to be piped, copper or aluminum or other metals as well as fiberglass, PVC, and similar materials may be utilized, as well.

The most important engineering criteria for a foam system of the type under consideration is that it must be treated as a bonded system. In other words, the foam is bonded to both the carrier pipe and the outer jacket. Therefore, the bonded system acts as a monolithic unit moving underground. Higher temperatures can act adversely upon the bonded foam system, however. The hot fluid in the steel carrier pipe causes the carrier pipe to thermally expand. At temperatures of 400° F. this expansion is on the order of 2.8 inches per 100 feet of pipe. This expansion is not a problem as long as the system remains bonded and the carrier pipe, foam and jacket move together as one unit underground. This movement is controlled by the expansion force of the steel carrier pipe, but it is the bond strength of the foam to the pipe and jacket that is important in keeping the system moving together. This monolithic movement of the system occurs along each incremental length of a particular run, and as long as total movement is not greater than 4 to 6 inches and the system remains bonded, no undue stress is subjected at any one point of the jacket. If the system however were to disbond, the surrounding soil would fix the jacket in place and the carrier pipe would still thermally expand thereby pushing thorough and destroying the jacket at the first change of direction.

It has been well established by industry case history that the polyurethane foam bond for systems running at 250° to 300° is strong enough to keep the entire system acting as a bonded system. However, for systems running above these temperatures a higher temperature rated foam, such as polyisocyanurate foam, is required. Even in systems utilizing "high temperature" polyiscyanurate foam, the higher heat can begin to fry the foam at the foam/carrier pipe interface thereby bringing into question the strength of the foam bond to the steel carrier pipe. Therefore, systems with temperatures exceeding 250° to 300° F. are at risk of having the carrier pipe disbond and push through the jacket at changes of direction.

Various approaches have been taken to control this undesirable expansion in insulated pipe systems of the type under consideration. For example, expansion "bolster" materials are supplied in the form of resilient pads which can be used to wrap the HDPE jacket at elbows or expansion loops. Various mechanical approaches have also been tried including bellows-like structures along the length of the pipe line or at the elbows or expansion loops.

Despite the above advances, a need exists for improvements in a bonded foam system which will ensure that the insulating foam remains bonded to the carrier pipe. The advent of higher temperature foams allows for higher temperature foamed piping systems to be manufactured. However, at temperatures exceeding 250° to 300° the bond strength of the newer foams comes into question.

A need continues to exist for a bonded foam system of the above type which effectively prevents or eliminates foam disbondment, even at temperatures above 250 to 300° F.

SUMMARY OF THE INVENTION

The present invention has as its general purpose to provide a system to maintain and support the foam/carrier pipe bond of an insulated piping system, which satisfies the previously described deficiencies.

This object is accomplished by providing an underground piping system capable of servicing temperatures in excess of 250° F. in which a metal carrier pipe is insulated by a high temperature foam. The unit of piping must remain bonded so that it will move as a single monolithic unit underground. In one embodiment, a first and second length of insulated and jacketed pipe are provided, each having a joining end to be joined to an end of the other length. Each of the pipe lengths comprises an inner metal pipe having an interior surface and an exterior surface. A special thermally protective coating is first applied, as by spraying, to the exterior surface of the inner metal pipe. An envelope of foamed insulation is then applied so that it surrounds the inner pipe exterior surface. An outer protective HDPE jacket surrounds the envelope of insulation. The layer of thermally protective coating bonds to both the exterior of the inner pipe and to the surrounding foam insulation. The joining ends of adjacent pipe lengths are afixed, as by being welded together, to form fixed joints, whereby the adjacent pipe lengths provide a continuous fluid conduit for conveying high temperature fluids.

Any of the bonded foam type pre-insulated piping systems may benefit from the techniques of the present invention. However, those systems in which fluid temperatures in excess of 250° F. are likely to be encountered are perhaps best suited for the practice of the present invention. It is these systems which generally require higher temperature foams and which also bring into question the strength of the foam bond. In a particularly preferred form of the invention, the objects of the invention are accomplished by coating the outside of the carrier pipe with a special ceramic type coating. The preferred coating material is comprised of amorphous silica in an acrylic binder.

Additional objects, features and advantages will be apparent in the written description which follows.

DETAILED DESCRIPTION OF THE INVENTION

Figure 5:
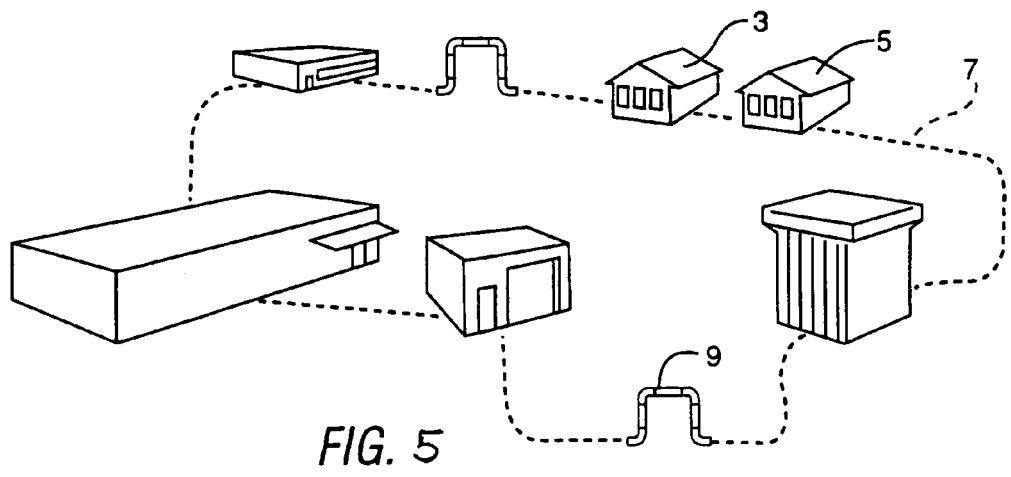
FIG. 5 is a simplified representation of a typical distributed HVAC system utilizing chilled water for cooling and steam for heating.
Figure 6:
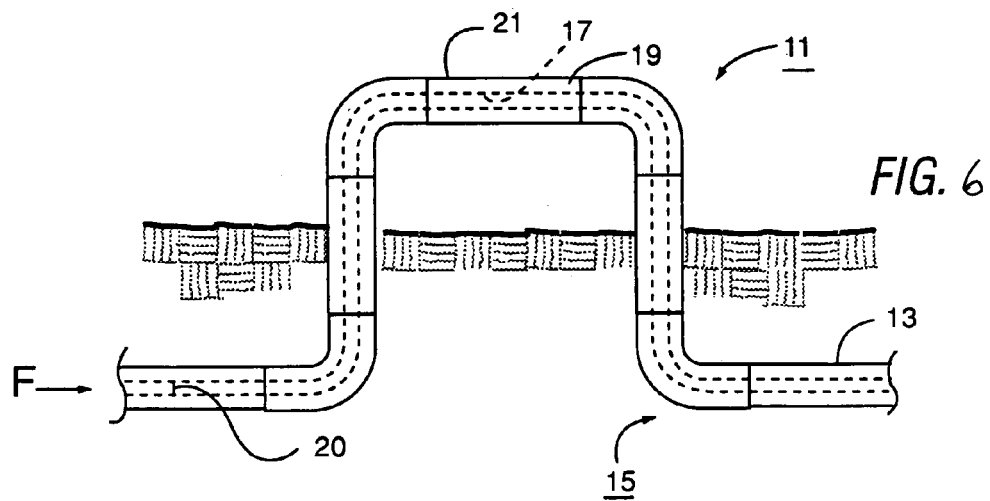
FIG. 6 is a schematic representation of an expansion loop in a pre-insulated pipeline prior to thermal expansion.
Figure 7:
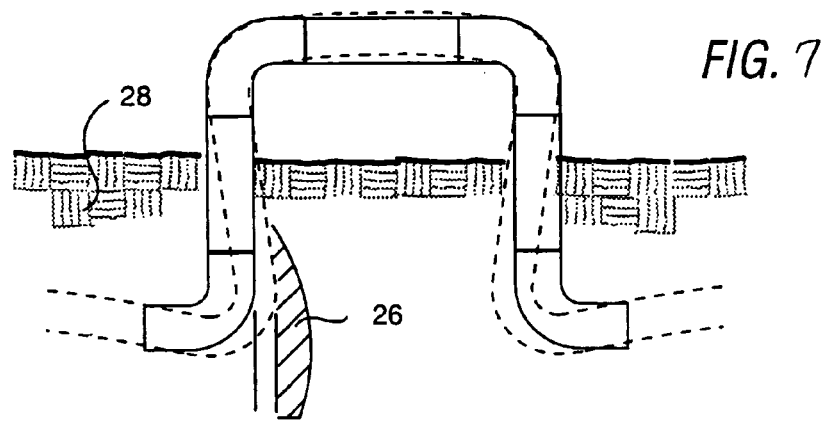
FIG. 7 is a schematic view of the pipeline of FIG. 6 under the influence of thermal expansion forces.

Turning first to FIGS. 5–7, there is illustrated a typical environment in which the pre-insulated piping systems of the invention might be employed. FIG. 5 shows a school campus having a number of isolated buildings 3, 5 connected by an underground insulated pipeline carrying steam which at points includes right angle loops or elbows 9.

FIGS. 6 and 7 are schematic views of the standard piping installation of the type under consideration designated generally as 11. The installation 11 includes a number of coaxially oriented lengths of pipe, such as length 13 (shown broken away in FIG. 6). The installation may also include a number of angled fittings such as the right angle elbows (generally shown as 15) in FIG. 6. Each length of pipe includes an inner pipe 17, typically formed of steel, an envelope of foamed insulation 19 surrounding the inner pipe and outer protective jacket 21 surrounding the envelope of insulation. The joining ends (shown generally at 20 in FIG. 6) of adjacent pipe lengths are afixed, as by being welded together, to form fixed joints, whereby the adjacent pipe lengths provide a continuous fluid conduit for conveying high temperature fluids. The jacket 21 is typically formed of high density polyethylene (HDPE) or a similar polyolefin type material. The following references, among others, teach the manufacture of such prior art systems: U.S. Pat. Nos. 3,793,4111; 4,084,842; and 4,221,405, all issued to Stonitsch et al.

The piping systems of the type illustrated in FIGS. 6 and 7 are sometimes utilized to convey fluids at high temperature and/or pressures. For example, a typical steam line might be conveying fluid at, for example, 400° F. The temperature differentials which exists between the piping system materials and the fluid being conveyed can cause a force "F" to be applied along the coaxially aligned pipes lengths. If the carrier is free to move independently from the foam and jacket (disbondment has occurred) then the surrounding soil will fix the jacket in place and the carrier pipe will burst through the foam and jacket in areas 15 and 13 of FIG. 6.

In the piping system illustrated in FIG. 7, the system is displacing as a unit and moves into both a cushioned bolster padding 26 and the surrounding soil 28. This movement does not damage the jacketing or the foam of the system because they are both incrementally being pulled along throughout the entire length of the straight run. Because of this monolithic movement no one individual section of the jacket is over stressed and thereby ruptured, and no one individual section of the foam is required to support the entire force of the thermal expansion of the pipe. The bond distributes these forces along each incremental length of the entire run. It will be understood, however, that should the forces become great enough, disbondment of the foam from the carrier pipe can occur.

The present invention is directed toward an expansion installation for high temperature insulated piping systems of the type illustrated generally in FIGS. 5–7. The present invention is intended to provide a solution for possible disbondment problems for foam bonded piping systems that are operating at temperatures in the range of 250° F. and above 250° F. At temperatures that begin to exceed 250° F., foams have been developed that are stable structurally to handle these higher temperature, but the bond strength of the foams at these temperatures may come into question. The invention is intended to prevent the potential problems that might occur if the foam bond strength is not sufficient to cause the system to expand as one monolithic item.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy conveying pipes, open or closed cell polyurethane, polyisocyanurate, polystyrene or the like, foamed rigid insulation and polypropylene, polybutylene, polyethylene, polyvinylchloride and similar protective jackets.

The term "high temperature", as used in this discussion, will be any temperature exceeding 250° F., which is the present temperature limitation at which polyurethane foam is used in bonded foam systems. Temperatures above 250° F. require the use of higher temperature foams, such as polyisocyanurate foam, whose bond strength may come into question.

The present invention is an improvement to presently available pre-insulated piping of the type which is commercially available and familiar to those in the relevant industries. Prior art pipe lengths of this general type are commercially available as standard factory type product. For example, such product is available from Thermacor Process, LP of Fort Worth, Tex., assignee of the present invention. One typical example is sold commercially as the HT-406 High Temp Steel Piping System. The published specifications for systems are as follows:

Carrier Pipe-

| | |
|---|---|
| diameter less than about 2" | A53 ERW Grade B, Std. Wt. Black Steel |
| diameter greater than about 2" | A106 SML, Std. Wt. Black Steel |

-continued

HDPE Jacket-

| | |
|---|---|
| Compatible with ASTM D3350 | |
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |
| Impact Strength (ASTM D256) | 2.0 ft. lb/in. North Min. |
| Rockwell Hardness (ASTM D785) | D60 (Shore) min. |

Polyisocyanurate Insulation-

| | |
|---|---|
| Density | $>2.4$ lbs/ft$^3$ |
| "K" Factor | $\leq 0.14$ @ 70° F., |
| | $\leq 0.24$ @ 406° F. |
| Compressive Strength | $>30$ psi |
| Closed Cell Content | $\geq 90\%$ |
| Minimum Thickness | $\geq 2.5"$ @ 366° F., |
| | $\geq 3.0"$ @ 406° F. |

The present invention concerns the discovery that many of the problems associated with disbondment of the prior art systems, such as those described above, can be overcome by applying a thermally protective ceramic coating to the exterior surface of the inner metal pipes prior to applying the insulating foam layer. An envelope of foamed insulation can then be applied over the thermally protective coating, the thermally protective coating bonding to both the exterior surface of the inner metal pipe and to the surrounding foamed insulation at an interface layer. The thermally protective coating is effective to reduce the temperature of the inner metal pipes at the interface layer to below that at which disbondment of the foam insulation would normally occur to thereby prevent separation of the envelope of foamed insulation from the exterior surface of the inner metal pipes as the temperature of the inner metal pipes increase.

The preferred thermally protective coating is a ceramic coating and, more specifically, is a ceramic coating which is comprised of amorphous silica in an acrylic binder. One commercially available ceramic coating material which is suitable for the purposes of the present invention is "CERAMIC COVER", sold by Envirotrol, Inc., of Conyers, Ga. The coating has the following published characteristics:

| | |
|---|---|
| Boiling Point | 212° F. |
| Specific Gravity | 0.59 |
| Vapor Pressure (mmHg) | 17 @ 25° C. |
| Solubility in Water | dilutable |
| Appearance and Odor | A viscous solution of ceramic and acrylic latex which has a slight ammonia odor |

The particularly preferred "CERAMIC COVER" coating material can be obtained in liquid form and can be applied by spraying using conventional air assisted spraying equipment. The coating has both insulating and corrosion resistant properties which are derived from the amorphous silica or ceramic base. Encapsulating the ceramic compound is an extremely high quality acrylic binder which provides elasticity and strong adhesion. A thin coat of the material on the order of 16 mils thickness has been found to have an R value of approximately 20 in the particular environments tested.

Figure 1:
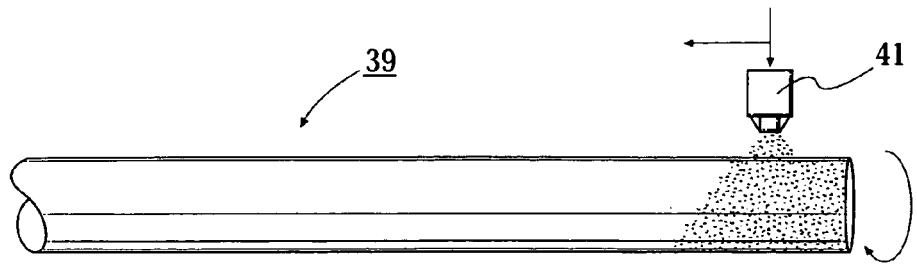
FIG. 1 is a simplified, side view of the first step of the method of the invention in which a special thermally protective coating is applied to the exterior surface of the inner metal pipe.
Figure 2:
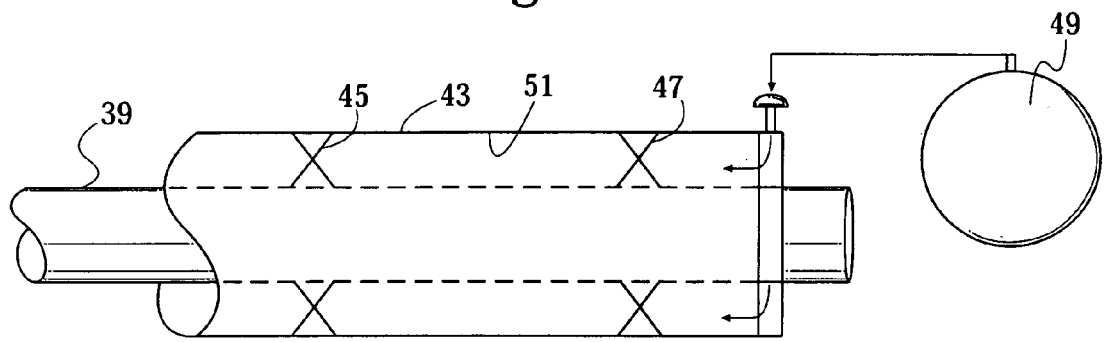
FIG. 2 is a view similar to FIG. 1 showing the next step in the method in which a thermoplastic jacket is positioned about the inner metal pipe and a foam material is placed between the jacket and the exterior surface of the inner pipe.
Figure 3:
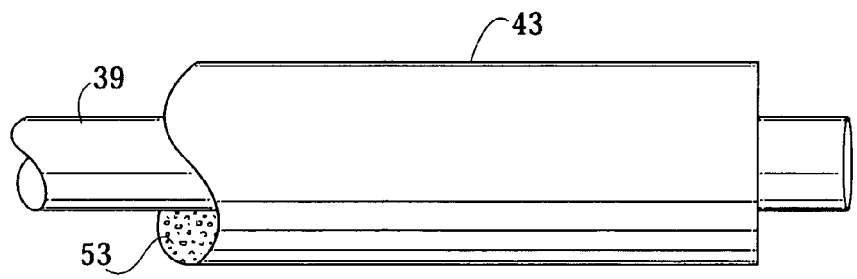
FIG. 3 is a view similar to FIG. 2 but showing the cured foam which bonds to both the inner carrier pipe and to the surrounding thermoplastic jacket.
Figure 4:
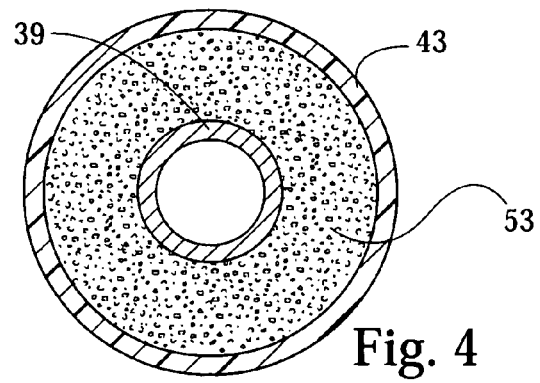
FIG. 4 is an end view, partly in section of the completed pre-insulated pipe of the invention.

Turning to FIG. 1, the first step in the method of the invention is illustrated. An inner metal or carrier pipe 39 has the thermally protective coating of the invention applied thereto, as by spraying with a directional spray head 41. In FIG. 2, the coated pipe 39 is surrounded by the outer thermoplastic jacket 43 which is positioned by means of standoff's 45,47. A foam insulating material from a suitable supply source 49 is then pumped into the annular space 51 between the pipe exterior and the interior of the thermoplastic jacket and allowed to set (illustrated as 53 in FIG. 3). In the particular embodiment of the invention illustrated in FIG. 3, the surrounding foam insulation layer 53 is typically polyisocyanurate foam insulation for systems above 250° F. The surrounding jacket 43 is a polyolefin, preferably HDPE.

The thickness of the ceramic coating layer is generally on the order of about 10 to 50 mils thick. A 20 mil coating has been found to drop the interface temperature from about 400° F. to about 320° F. in installations of pre-insulated piping of the type described above.

An invention has been provided with significant advantages. The possibility of disbondment of the carrier pipe from the high temperature foam has been greatly reduced or eliminated even at process temperatures above 250°. In the system of the invention, the thermally protective coating reduces the temperature of the interface between the carrier pipe exterior and the surrounding foam insulating layer to below that temperature at which disbondment of the foam insulation would normally occur to thereby prevent separation of the envelope of foamed insulation from the exterior surface of the inner metal pipe. The system will continue to act as one monolithic bonded system even if high temperature fluids are being transported or if the temperature of the operating environment increases. As a result, the integrity of the system is preserved even at the higher temperatures contemplated.

While the invention has been shown in one of its forms, it is not thus limited but is susceptible to various changes and modifications without departing from the spirit thereof.

What is claimed is:

1. A method of preventing disbondment of a surrounding foam insulating layer in a bonded foam type pre-insulated piping system, the method comprising the steps of:

providing a first and second length of insulated and jacketed pipe, each having a joining end to be joined to an end of the other length, each pipe length comprising an inner steel pipe having an interior surface and an exterior surface;

spraying a layer of a thermally protective ceramic coating onto the exterior surface of the inner metal pipes;

spraying an envelope of foamed insulation which surrounds the inner pipes exterior surface and envelopes the inner pipes;

applying an outer protective jacket, formed of a synthetic polyolefin, which surrounds the envelope of insulation, the joining ends of adjacent pipe lengths being welded together to form fixed joints, whereby the adjacent pipe lengths provide a continuous fluid conduit for conveying high temperature fluids;

wherein the thermally protective ceramic coating is applied in a predetermined thickness range which is effective to reduce the temperature of the inner metal pipes at the interface layer to below that at which disbondment of the foam insulation would occur and thereby prevent separation of the envelope of foamed insulation from the exterior surface of the inner metal pipes as the temperature of the inner metal pipes increase; and wherein the foam insulation which is used to surround the inner pipes is a high temperature polyisocyanurate foam.

2. The method of claim 1, wherein the thermally protective coating comprises amorphous silica in an acrylic binder.

3. The method of claim 1, wherein the thermally protective ceramic coating is sprayed on to a thickness ranging from about 10 to 50 mils.

4. The method of claim 1, wherein the protective jackets are formed of HDPE.

5. The method of claim 1, wherein the lengths of insulated piping are part of a pipeline conveying steam at a temperature above about 250° F.

* * * * *